United States Patent [19]
Suzuki et al.

[11] Patent Number: 5,611,832
[45] Date of Patent: Mar. 18, 1997

[54] DIESEL PARTICULATE FILTER APPARATUS

[75] Inventors: Shogo Suzuki, Yamato; Hideo Kawamura, Samukawa-machi; Akira Higashino, Fujisawa, all of Japan

[73] Assignee: Isuzu Ceramics Research Institute Co., Ltd., Kanagawa-ken, Japan

[21] Appl. No.: 528,357

[22] Filed: Sep. 14, 1995

[30] Foreign Application Priority Data

| Sep. 21, 1994 | [JP] | Japan | 6-251565 |
| Sep. 26, 1994 | [JP] | Japan | 6-254158 |
| Sep. 26, 1994 | [JP] | Japan | 6-254159 |

[51] Int. Cl.$^6$ .................................................. B01D 46/00
[52] U.S. Cl. .............................. 55/523; 55/524; 55/527; 55/DIG. 10; 55/DIG. 30
[58] Field of Search .......................... 55/523, 524, 527, 55/DIG. 10, DIG. 30

[56] References Cited

U.S. PATENT DOCUMENTS

| 3,927,165 | 12/1975 | Grochol et al. | 55/524 X |
| 4,181,514 | 1/1980 | Lefkowitz et al. | 55/523 X |
| 4,211,661 | 7/1980 | Perry | 55/524 X |
| 4,680,221 | 7/1987 | Murayama et al. | 428/246 |
| 4,761,323 | 8/1988 | Mühlratzer et al. | 55/523 X |
| 5,174,969 | 12/1992 | Fischer et al. | 55/527 X |
| 5,196,120 | 3/1993 | White | 55/523 X |
| 5,380,580 | 1/1995 | Rogers et al. | 55/523 X |
| 5,474,586 | 12/1995 | Eaton et al. | 55/523 X |
| 5,486,220 | 1/1996 | Honda et al. | 55/523 X |
| 5,500,029 | 3/1996 | Zievers et al. | 55/523 X |

FOREIGN PATENT DOCUMENTS

| 0223022 | 5/1987 | European Pat. Off. . | |
| 0425433 | 5/1991 | European Pat. Off. . | |
| 2810937 | 9/1979 | Germany | 55/527 |
| 2830707 | 1/1980 | Germany . | |
| 2-049913 | 2/1990 | Japan | 55/523 |
| 7-289830 | 7/1995 | Japan . | |

OTHER PUBLICATIONS

Database WPI, Section Ch, Week 8741, Derwent Publications Ltd., London GB; Class A10, AN 87–288528 & JP–A–62 201 939 (Nippon Oil), 05 Sep. 1987 * abstract*.

*Primary Examiner*—Robert Spitzer
*Attorney, Agent, or Firm*—Browdy and Neimark

[57] ABSTRACT

According to the present invention, a filter body for collecting particulates is constituted of a fiber laminate material produced by laminating a fiber material comprising a core material in the form of a fiber, and a covering layer of a material different from that of the core material formed around the outer periphery of the core material by coating. The core material of the fiber material is selected from among inorganic fibers such as glass or ceramic fibers containing alumina, and heat-resistant alloy fibers each made of a heat-resistant alloy selected from among Ti-Al alloys, Fe alloys containing at least one of Mo, Cr and Ni, and Fe-Cr-Al-Y alloys. The covering layer is made of a material selected from among silicon carbide ceramics respectively derived from polytitanocarbosilane, polysilazane and polycarbosilane, thermoplastic materials, silicon carbide ceramics such as Si-C, Si-Ti-C-O and Si-C-O or silicon nitride ceramics such as Si-N-C-O, alumina ceramics, and zirconia ceramics.

21 Claims, 3 Drawing Sheets

DIESEL PARTICULATE FILTER APPARATUS

BACKGROUND OF THE INVENTION

1. Field of the Invention

The present invention relates to a diesel particulate filter apparatus for collecting particulates from exhaust gas discharged from a diesel engine with the filter thereof.

2. Description of the Prior Art

A diesel particulate filter made of, e.g., cordierite ($2MgO \cdot 2Al_2O_3 \cdot 5SiO_2$) as the material thereof is known as a conventional exhaust gas treatment filter for collecting particulates, i.e., particulate substances, such as carbon, soot and hydrocarbons (HC) from exhaust gas discharged from a diesel engine.

A filter made using as the material thereof an inorganic fiber instead of cordierite is also known. In a diesel particulate filter apparatus having a filter made of an inorganic fiber, the filter is lightweight and is produced by laminating an inorganic fiber material and locally weaving an inorganic fiber material into the resulting laminate material to effect felting thereof. The filter made of the inorganic fiber material can advantageously be miniaturized as compared with a honeycomb filter made of cordierite because the former enables particulates such as black smoke in exhaust gas discharged from a diesel engine to be trapped in the inner part of the filter as well as on the surface thereof.

However, the conventional diesel particulate filter apparatus having the filter produced using the inorganic fiber, though advantageous in the foregoing respect, is not only fragile when subjected to vibrations and impacts due to the brittleness of the inorganic fiber material itself constituting the filter so as to create a fear of the filter being broken, but such a filter is also problematically high in cost.

Particularly in the step of felting the inorganic fiber and in the step of assembling a diesel particulate filter apparatus of an inorganic fiber type, the high modulus of elasticity of the inorganic fiber makes it brake and become separated into fine pieces during the felting step and the assemblying step, and the fine pieces of the separated fiber are scattered and deteriorate the working environment to cause problems such as irritation of the skins and throats of workers.

On the other hand, the conventional diesel particulate filter made of cordierite collects black smoke on the surface of the filter, so that the pressure loss of exhaust gas is rapidly increased in keeping with the progressive collection of particulates. Accordingly, the area of the filter necessary for collection of particulates is inevitably increased to disadvantageously enlarge a diesel particulate filter apparatus itself. Meanwhile, the filter used for collection of particulates such as black smoke is reproduced through ignition of the collected particulates at an end thereof and subsequent propagative combustion and incineration of the particulates. Thus, the reproduction of the filter is effected incompletely. Thereafter, particulates are collected using the reproduced filter in such a state that the residual particulates are abnormally deposited on the filter. When the filter is subsequently reproduced again or when the particulates deposited on the filter are self-ingited, the filter is consequently overheated to a temperature of at least 1,000° C. to cause fusion damage to the filter, cracking of the filter, etc., resulting in breakage of the filter.

An inorganic fiber is used to produce a conventional diesel particulate filter. The use of the inorganic fiber instead of a monolithic porous material as the material of the filter can prevent the filter from undergoing damage such as cracking due to thermal stress.

Where a filter is to be made of an inorganic fiber in view of the foregoing, the inorganic fiber is required to have properties such as a heat resistance, oxidation resistance, $NO_x$ resistance, $SO_x$ resistance, flexibility and fiber fabricability so as to permit the fibers to be formed into a filter. A silicon carbide ceramic is mostly used as the material of the inorganic fiber capable of exhibiting such properties.

However, a filter body made using an inorganic fiber of such a silicon carbide ceramic, though advantageous in the foregoing respect, involves a problem of high cost because polytitanocarbosilane or polycarbosilane is used as the starting material of the inorganic fiber constituting the filter body. There is further a fiber comprising alumina and silica as inexpensive materials of inorganic fibers, which is however problematic in respect of properties such as heat resistance and flexibility.

Meanwhile, the applicant of the instant application developed a diesel particulate filter made of an inorganic continuous filament, and previously filed a patent application directed thereto which is Japanese Patent Application No. 114,131/1994. This diesel particulate filter is produced by horizontally irregularly orienting and laminating cut pieces of a heat-resistant inorganic continuous filament cut to a predetermined length, needling the resulting laminate to effect vertical entanglement of the inorganic continuous filament, superposing wire nets made of a heat-resistant metal on both the upper and lower surfaces of the resulting felting material, and fastening them from both surfaces thereof with a heat-resistant yarn. Herein, the above-mentioned inorganic continuous filament is a fiber made of a material selected from among Si-Ti-C-O, Si-C-O, Si-N, SiO and metals, and having the surfaces thereof coated with at least one of silicon carbide, aluminum and alumina.

SUMMARY OF THE INVENTION

An object of the present invention is to solve the foregoing problems of the prior art, i.e., to provide an inexpensive and useful diesel particulate filter apparatus to be incorporated into an exhaust system for purification treatment of exhaust gas discharged from a diesel engine through collection therewith of particulate substances, i.e., particulates, such as carbon, soot and HC contained in the exhaust gas, wherein the filter body thereof is produced by laminating an inorganic fiber material comprising inexpensive alumina and silicon carbide used in combination for reduction of the material cost thereof, whereby the filter as a whole can be not only endowed with necessary properties but also prevented from embrittling to secure high-temperature strength.

The filter body of this diesel particulate filter apparatus is constituted of a fiber laminate material produced by laminating an inorganic fiber material comprising a glass or ceramic fiber containing alumina as the core material and a covering layer made of a silicon carbide ceramic and formed around the outer periphery of the core material by coating.

The above-mentioned covering layer may be formed using polytitanocarbosilane, polysilazane or polycarbosilane.

The filter body may be constituted of an irregular laminate portion having the inorganic fiber material irregularly laminated, and weaving yarn portions having weaving yarns woven thereinto locally on the surfaces of the irregular laminate portion and crosswise in the thickness-wise direction thereof. The above-mentioned core material of the inorganic fiber material may comprise alumina and zirconia. Alternatively, the core material of the inorganic fiber material may comprise alumina and silica. Further, the core material of the inorganic fiber material comprising alumina and silica may be constituted of cordierite or mullite. Alternatively, the core material of the inorganic fiber material may comprise at least 98% of alumina.

In this diesel particulate filter apparatus having the foregoing constitution, the covering layer can cover the heat resistance and flexibility of the glass or ceramic fiber as the core material not only to improve the heat resistance of the filter as a whole but also to prevent embrittlement and deterioration in strength of the filter at high temperatures. Thus, the filter body constituted of the aforementioned fiber laminate material can be prevented from deteriorating in strength, while the filter as a whole can be increased in strength under heat to resist thermal stress caused by repeated thermal cycles and thereby minimize the damage to the filter body. Thus, an inexpensive practical product can be provided. Further, since the filter body may be made of an inorganic fiber of a ceramic, the filter can be increased in strength under heat, whereby the efficiency of collection of particulates such as black smoke, carbon and smoke contained in exhaust gas can be improved when the exhaust gas is passed across the filter body.

Another object of the present invention is to provide a diesel particulate filter apparatus wherein the filter body thereof is made of an inorganic fiber as a core material which is covered with a flexible material for the purpose of solving the problem of breakage of the fiber in the step of producing the inorganic fiber, in the step of assembling the filter apparatus, etc. to prevent the inorganic fiber from being broken and scattered to thereby improve the workability thereof.

The filter body of this diesel particulate filter apparatus is constituted of a fiber laminate material produced by laminating a fiber material comprising a ceramic inorganic fiber material as the core material and a covering layer made of a flexible material and formed around the outer periphery of the core material by coating.

The inorganic fiber as the core material may be made of an Si-C-O, Si-Ti-C-O or Si-C silicon carbide ceramic. Alternatively, the inorganic fiber as the core material may comprise alumina or zirconia.

The above-mentioned covering layer may be made of a material capable of incineration through a reaction thereof with oxygen at a temperature of at most 600° C. The covering layer may be made especially of a material capable of incineration through a reaction thereof with oxygen for conversion thereof into $CO_2$ and $H_2O$. Further, the covering layer may be made of a thermoplastic resin such as polyvinyl alcohol, polyvinyl butyral, an acrylic resin, a polyamide resin, a fluororesin, polyethylene terephthalate, polyethylene or polypropylene.

Since this diesel particulate filter apparatus has the foregoing constitution, the brittleness of the ceramic of the inorganic fiber material can be covered by the covering layer to make it hard to break, whereby the fiber thereof can be prevented from being broken, separated and scattered from the body of the fiber material not only to improve the yield of, e.g., a felting material in the case of forming the fiber material into the felting material but also to improve the workability thereof. When conventional filter bodies are manufactured, masks, gloves and protective suits are always necessary for workers. By contrast, no ceramic fibers are scattered and suspended in air in the course of manufacturing filter bodies according to the present invention to greatly improve the working environment while making the work done by workers with gloves alone, for example.

Further, since the covering layer may be made of a thermoplastic resin of an organic polymer which is incinerated when the diesel particulate filter apparatus is operated, the filter function of collecting particulates in exhaust gas is not spoiled. Since the filter body may be made of a fiber material comprising as the core material an inorganic fiber material of a ceramic containing alumina or zirconia, the strength thereof under heat can be enhanced to improve the efficiency of collection of particulates such as black smoke, carbon and smoke contained in exhaust gas when the exhaust as is passed across the filter body.

Further, since the organic polymer that may be used in the covering layer covering the outer periphery of the ceramic fiber, i.e., the inorganic fiber, may be a material capable of incineration through a reaction thereof with oxygen at a temperature of at most 600° C., especially a material capable of incineration through a reaction thereof with oxygen for conversion thereof into $CO_2$ and $H_2O$, the covering layer in the filter body can be heated and incinerated to be exhausted, for example, when the diesel particulate filter apparatus incorporated into the exhaust system of a diesel engine is once operated. Accordingly, the area of the covering layer can secure a space for collecting particulates contained in exhaust gas without any decrease in the efficiency of collection of particulates. Thus, a good filter body can be formed.

Still another object of the present invention is to solve the aforementioned problems of the prior art, i.e., to provide an inexpensive diesel particulate filter apparatus having a high strength against vibrations and impacts, and to be incorporated into an exhaust system for collecting particulate substances, i.e., particulates, such as carbon, soot and HC contained in exhaust gas for the purpose of purifying the exhaust gas discharged from a diesel engine; wherein the filter body thereof is produced by vertically and horizontally entangling a metallic fiber of a heat-resistant alloy having the surface thereof coated with a heat-resistant and anticorrosive ceramic for the purpose of obviating the demerits of an inorganic fiber.

In this diesel particulate filter apparatus, the filter body thereof is constituted of a fiber laminate material made of a fiber material comprising a fiber of a heat-resistant alloy selected from among Ti-Al alloys, Fe alloys containing at least one of Mo, Cr and Ni, and Fe-Cr-Al-Y alloys.

Further, the above-mentioned fiber of the heat-resistant alloy, i.e., the heat-resistant alloy fiber material, is covered with a covering layer of a ceramic. The ceramic of the covering layer may be selected from Si-C, Si-Ti-C-O and Si-C-O as silicon carbide ceramics, alumina, and zirconia. The thickness of the covering layer may be set to be at most 20% of that of the heat-resistant alloy fiber material as the metallic core material.

There may further be a reaction product layer between the heat-resistant alloy of the heat-resistant alloy fiber material and the ceramic of the covering layer. Further, the heat-resistant alloy of the heat-resistant alloy fiber material and the ceramic of the covering layer may be selected in such a way that the difference therebetween in coefficient of linear thermal expansion is at most 1.5-fold. Alternatively, an intermediate material having a function of providing a gradient of coefficient of linear thermal expansion may be interposed between the heat-resistant alloy fiber material and the covering layer to control the difference in coefficient of linear thermal expansion in the boundary therebetween to at most 1.5-fold, when the difference in coefficient of linear thermal expansion between the heat-resistant alloy of the heat-resistant alloy fiber material and the ceramic of the covering layer exceeds 1.5-fold.

Since the core material of the fiber material in the filter body of this diesel particulate filter apparatus having the foregoing constitution is not a ceramic but a metal, the fiber material is not brittle unlike the conventional ceramic fiber materials and is strong against vibrations and impacts while reducing the cost of the filter. Thus, an inexpensive filter body having a high strength against vibrations and impacts can be produced.

Further, since the filter body is made of the heat-resistant alloy fiber, the strength thereof under heat can be enhanced and the pressure loss of exhaust gas can be controlled to a low level despite a high efficiency of collection of particulates such as black smoke, carbon and smoke contained in the exhaust gas when the exhaust gas is passed across the filter body.

Further, since the surface of the heat-resistant alloy fiber material is covered with the covering layer of a ceramic such as an Si-C, Si-Ti-C-O or Si-C-O silicon carbide ceramic, alumina, or zirconia, the heat resistance and corrosion resistance thereof are improved to further improve the strength under heat of the filter body. Thus, a durable, stable and long-life filter body can be produced. Particularly since the thickness of the ceramic covering the heat-resistant alloy fiber material may be set to be at most 20% of that of the heat-resistant alloy fiber material as the metallic core material, the fall-off amount of the covering layer, i.e., the ceramic, after heat cycles can be decreased, whereby the filter body can be endowed with a durability and a long life span.

DETAILED DESCRIPTION OF THE EMBODIMENTS

Examples of the diesel particulate filter apparatus (hereinafter referred to as "DPF") according to the present invention will now be described while referring to the accompanying drawings. An example of DPF will first be described while referring to FIGS. 1, 2, 3 and 7.

Figure 1:
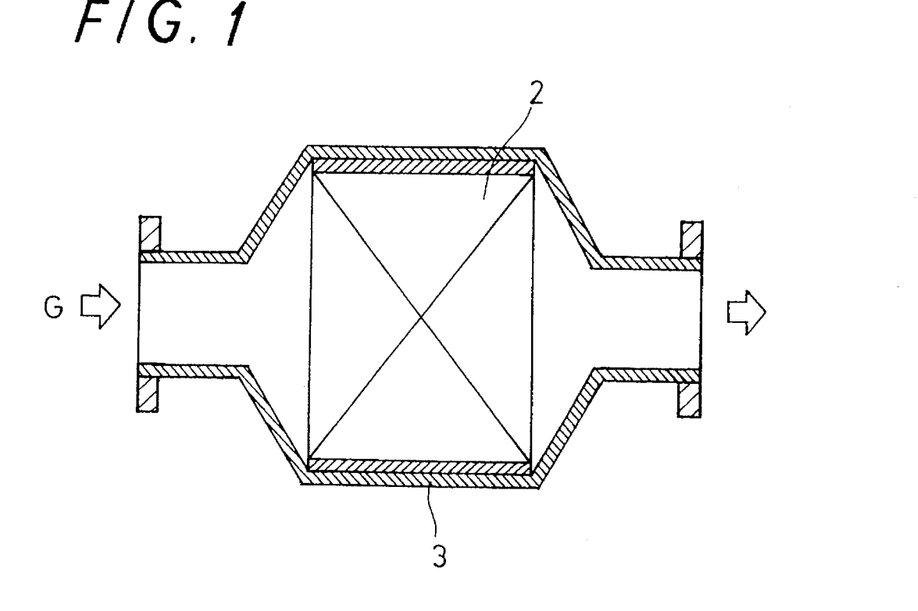
FIG. 1 is a schematic illustration showing an example of the diesel particulate filter apparatus of the present invention.
Figure 2:
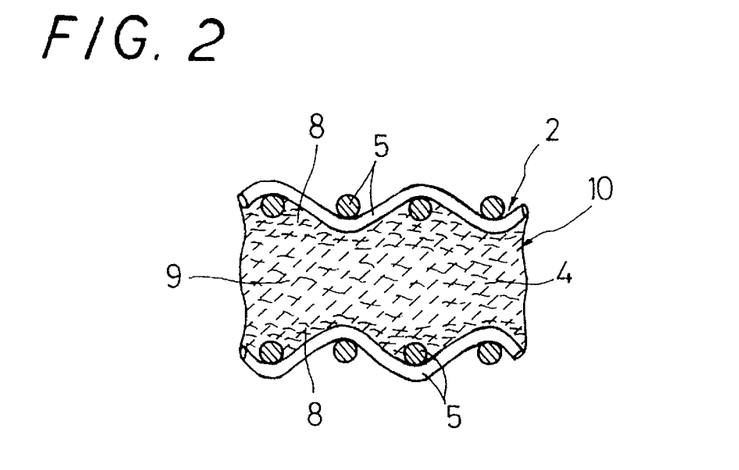
FIG. 2 is a cross-sectional view showing part of a filter body incorporated into the diesel particulate filter of FIG. 1.

This DPF is such that particulates such as black smoke, carbon, soot and HC contained in exhaust gas discharged from a diesel engine are collected by the filter body thereof, and the collected particulates are heated and incinerated to reproduce the filter body. In this example, reproduction of the filter body 2 can be accomplished by flowing electricity through a wire net 5 to heat the filter body 2 to thereby heat and incinerate particulates collected in the filter body 2 like in the case of the conventional filter apparatuses. Herein, the detailed description of reproduction of the filter body is dispensed with. This DPF is so constituted as to be contained in a case positioned, for example, in the exhaust path of a diesel engine. When exhaust gas is passed across the filter body, particulates such as carbon, smoke and black smoke contained in the exhaust gas are attached to and deposited between fibers of the filter body to effect collection of the particulates in the exhaust gas. The structure of the filter body 2, though not described in detail, may be in a cylindrical, barrel-like, flat sheet-like, wavy, pleated, or like form. The filter body 2 is disposed in a case 3 in such a way that exhaust gas can be flowed across the filter body.

Figure 3:
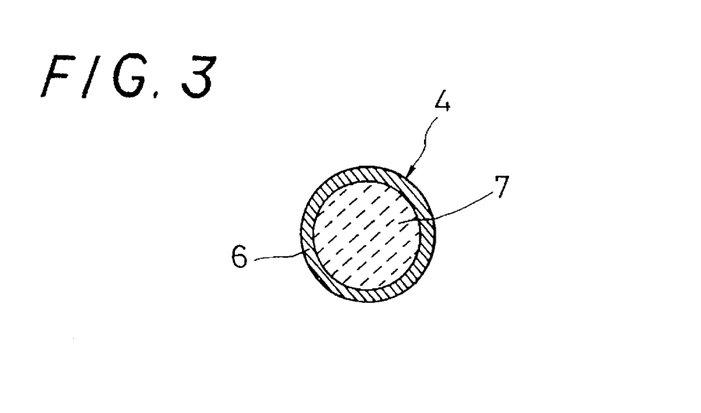
FIG. 3 is a cross-sectional view showing an example of a fiber of an inorganic fiber material constituting a filter body.

In this DPF, the filter body 2 is constituted of a fiber laminate material 10 produced by laminating an inorganic fiber material 4, and wire nets 5 made of a heat-resistant metallic material and disposed in contact with the fiber laminate material 10 sandwiched therebetween. The inorganic fiber material 4 is constituted of a core material 7 of an inorganic fiber in the form of a glass or ceramic fiber containing alumina, and a covering layer 6 made of a silicon carbide ceramic and formed around the outer periphery of the core material 7 by coating. The silicon carbide ceramic of the covering layer 6 can be selected from among Si-C-O, Si-Ti-C-O, and Si-C. The starting material of the silicon carbide ceramic may be polytitanocarbosilane, polysilazane, polycarbosilane, or the like. Polytitanocarbosilane has basic structural units represented by the following formulae. 6 kinds of basic structural units of polytitanocarbosilane are shown below.

wherein R = $C_nH_{2n+1}$ wherein n = 2~8
(small amount)

(trace amount)

The filter body 2 is constituted of an irregular laminate portion 9 located inside thereof and having the irregularly laminated inorganic fiber material 4 covered with the covering layer 6, and weaving yarn portions 8 into which weaving yarns of the inorganic fiber material 4 are woven locally on the outer faces of the irregular laminate portion 9 and crosswise in the thickness-wise direction thereof. The inorganic fiber material 4 contains either alumina and zirconia, or alumina and silica. When the inorganic fiber material 4 contains alumina and silica, it may be constituted of cordierite and mullite. From the standpoint of reduction of the cost, the alumina content of the inorganic fiber material 4 is preferably at least 98%.

Figure 7:
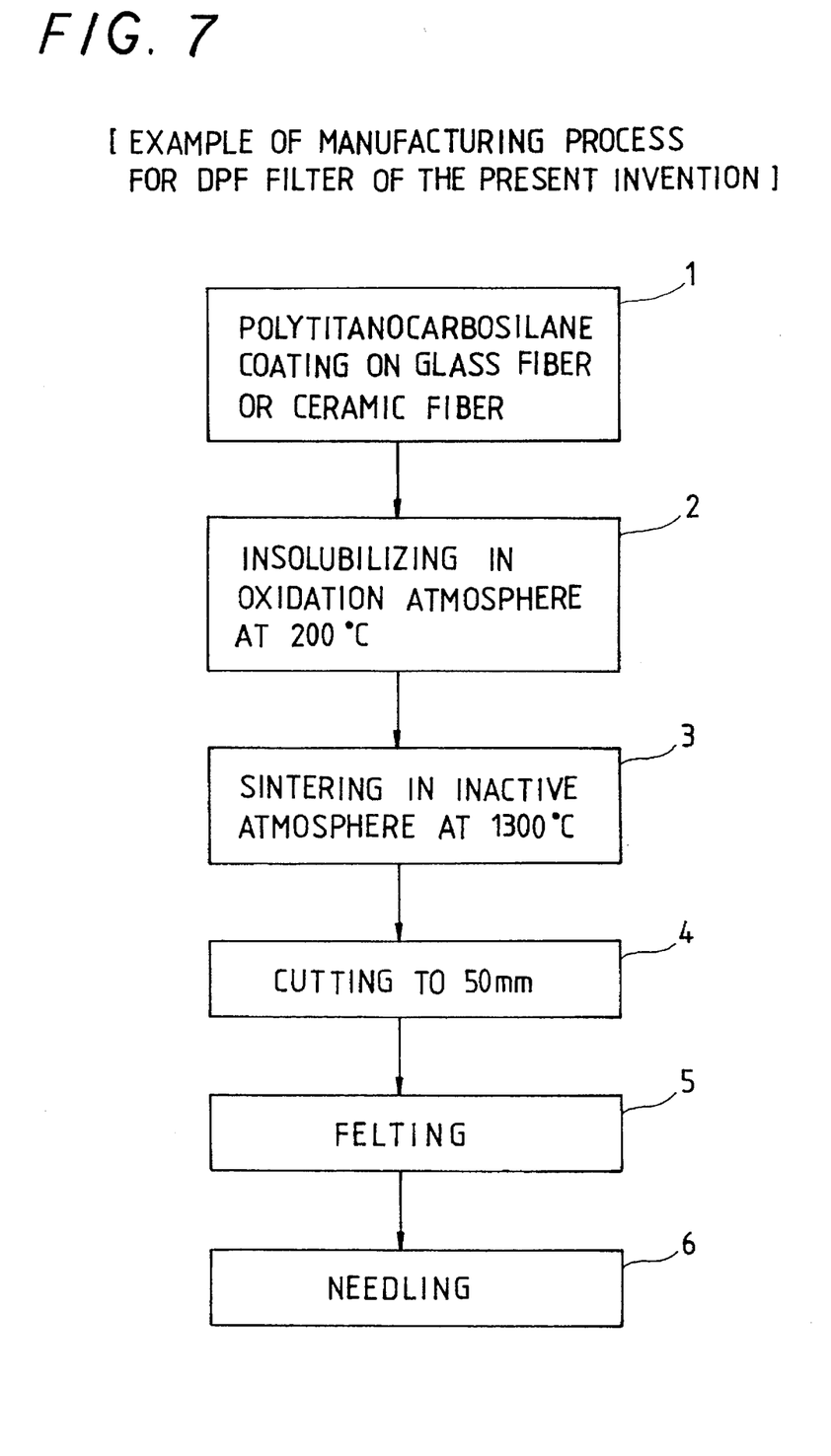
FIG. 7 is a process flow chart showing an example of the manufacturing process for the diesel particulate filter apparatus of the present invention.

This DPF can be produced according to the following procedure. The procedure of producing this DPF will be described while further referring to FIG. 7. FIG. 7 is a process flow chart showing an example of the manufacturing process for the DPF of the present invention.

In this manufacturing process for the DPF, a starting material of glass containing 98 wt. % of silicon oxide and 2 wt. % of alumina was formed into a continuous filament of 6 μm in diameter by melt spinning, and the outer periphery of the filament was coated with a solution of polytitanocarbosilane at a thickness of 1 to 2 μm (step 1). The filament coated with the solution of polytitanocarbosilane was subjected to an insolubilization treatment at a temperature of at most 200° C. in an air furnace, i.e., an oxidation atmosphere furnace (step 2). After the insolubilization treatment, the continuous filament was continuously sintered at 1,300° C. in a nitrogen furnace to form a covering layer 6 of a silicon carbide ceramic formed around the outer periphery of the inorganic fiber (filament) as a core material 7 by coating (step 3). In the step 3, other inactive atmosphere furnace may be used instead of the nitrogen furnace. The resulting continuous filament material was cut every 50 mm in length to form an inorganic fiber material 4 (step 4). The cut pieces of the inorganic fiber material 4 were oriented in random directions and laminated with a carding machine (step 5), and weaving yarns of the inorganic fiber material 4 were then woven locally and crosswise into upper and lower surface portions of the resulting laminate by needling to produce a felty fiber laminate material 10 of about 5 mm in thickness which material was constituted of an irregular laminate portion 9 located inside thereof and having the irregularly laminated inorganic fiber material, and weaving yarn portions 8 into which the weaving yarns of the inorganic fiber material 4 were woven locally on the outer faces of the irregular laminate portion 9 and crosswise in the thickness-wise direction thereof (step 6).

For comparison of the inorganic fiber material 4 of the filter body 2 of the present invention with a conventional one in respect of ordinary-temperature strength (MPa) and high-temperature strength (MPa), a filter body as a comparative product was produced by taking the step of carding an inorganic fiber material alone having no covering layer applied around the outer periphery of the inorganic fiber material and the step of needling the resulting laminate. As a result, the product according to the present invention wherein use was made of the inorganic fiber material 4 having the covering layer 6 of the silicon carbide ceramic formed around the outer periphery of the core material had a tensile strength at room temperature of 1500 MPa, whereas that of the comparative product was 1000 MPa. The product according to the present invention and the comparative product were also exposed to a temperature of 1,000° C. for 100 hours, followed by measurement of the tensile strengths thereof. The high-temperature strength of the product according to the present invention was 1000 MPa, whereas the high-temperature strength of the comparative product was 500 Mpa. It is believed from the foregoing results that application of the covering layer 6 of the silicon carbide ceramic around the outer periphery of the core material 7 of the inorganic fiber material 4 increased the room-temperature strength and high-temperature strength thereof, improved the heat resistance thereof and lowered the deterioration thereof particularly at high temperatures, and that the internal core material 7 of the inorganic fiber material 4 was prevented from embrittling with the aid of the covering layer 6 to be increased in strength.

Although an $SiO_2$-$Al_2O_3$ material was used as the material of glass fiber as the core material 7 of the inorganic fiber material 4 in the foregoing example of DPF, other material of glass fiber may alternatively be used. Examples of the other material of glass fiber that may be used as the core material 7 include $SiO_2$-$Al_2O_3$-$B_2O_3$-CaO, $SiO_2$-$Al_2O_3$-$ZrO_2$, $SiO_2$-$Al_2O_3$-$Fe_2O_3$-MgO-CaO, $SiO_2$-$Al_2O_3$-MgO-CaO, $SiO_2$( at least 98% )-$Al_2O_3$(at most 2%), and $SiO_2$-$Al_2O_3$-CaO-$Na_2O$. Besides these glass fiber materials, a ceramic fiber material may alternatively be used as the core material 7 of the inorganic fiber material 4. Examples of the material that may be used as the core material 7 include a mullite ($3Al_2O_3$-$2SiO_2$) fiber, a cordierite ($2MgO$-$2Al_2O_3$-$5SiO_2$) fiber, a zirconia-alumina ($ZrO_2$-$Al_2O_3$) fiber, and an alumina (containing at least 80% of $Al_2O_3$) fiber.

On the other hand, although silicon carbide containing titanium derived from polytitanocarbosilane was used as the silicon carbide ceramic of the covering layer 6, the kind of silicon carbide ceramic is not limited thereto and the silicon carbide ceramic of the covering layer 6 may alternatively be selected, for example, from among those derived from polysilazane, polycarbosilane, etc. containing no titanium.

Figure 4:
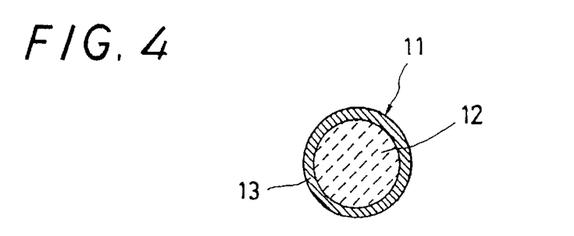
FIG. 4 is a cross-sectional view showing another example of a fiber of a fiber material constituting a filter body.

Another example of the DPF of the present invention will now be described while referring to FIGS. 1, 2 and 4.

In this DPF, the filter body 2 thereof is constituted of a fiber laminate material 10 produced by laminating a fiber material 11, and wire nets 5 made of a heat-resistant metallic material and disposed in contact with the fiber laminate material 10 sandwiched therebetween. The fiber material 11 is constituted of an inorganic fiber material 12 made of an inorganic fiber in the form of a glass or ceramic fiber containing alumina, and a covering layer 13 made of a flexible material and formed around the outer periphery of the inorganic fiber material 12 by coating. In this DPF, the filter body 2 thereof is constituted of an irregular laminate portion 9 located inside thereof and having the irregularly laminated inorganic fiber material 11 covered with the covering layer 13, and weaving yarn portions 8 into which weaving yarns of the fiber material 11 are woven locally on the outer faces of the irregular laminate portion 9 and crosswise in the thickness-wise direction thereof.

This DPF has the filter body 2 constituted of the laminated fiber material 11 comprising as the core material thereof the inorganic fiber material 12 made of the inorganic fiber, i.e., a ceramic fiber, and having the covering layer 13 of the flexible material formed around the outer periphery of the inorganic fiber material 12 by coating. The inorganic fiber material 12 is preferably constituted of an Si-C-O, Si-Ti-C-O or Si-C silicon carbide ceramic. In this case, the inorganic fiber material 12 may contain alumina ($Al_2O_3$) or zirconia ($ZrO_2$).

The covering layer 13 may be made of a material capable of incineration through a reaction thereof with oxygen at a temperature of at most 600° C. The covering layer 13 may be made especially of a material capable of incineration through a reaction thereof with oxygen for conversion thereof into $CO_2$ and $H_2O$. Specifically, the covering layer 13 may be made of a thermoplastic resin of an organic polymer, examples of which include polyvinyl alcohol, polyvinyl butyral, acrylic resins, polyamide resins, fluororesins, polyethylene terephthalate, polyethylene, and polypropylene.

This DPF can be produced according to the following procedure. In the manufacturing process for this DPF, a silicon carbide inorganic fiber material composed of elements Si-Ti-C-O and having a fiber diameter of 8.5 μm was used as the inorganic fiber material 12. The inorganic fiber material 12 was passed through a 15% aqueous solution of polyvinyl alcohol to coat the outer periphery of the inorganic fiber material 12 with polyvinyl alcohol, followed by drying. Thus, a polyvinyl alcohol coating film of 1 μm in thickness was formed around the outer periphery of the inorganic fiber material 12. Subsequently, the inorganic fiber material 12 having the polyvinyl alcohol coating film 13 formed therearound was cut every 50 mm in length to form a fiber material 11. In order to produce a felty filter body, the cut pieces of the fiber material 11 were randomly laminated with a carding machine, and weaving yarns of the fiber material 11 were woven into the resulting laminate by local crosswise needling thereof in upper and lower surface portions of the laminate having an irregular laminate portion 9 disposed inside thereof to effect felting thereof to thereby produce a fiber laminate material 10 comprising the irregular laminate portion 9 and weaving yarn portions 8 into which the weaving yarns of the fiber material 11 were woven locally on the outer faces of the irregular laminate portion 9 and crosswise in the thickness-wise direction thereof.

For comparison of the fiber laminate material 10 of the filter body 2 according to the present invention thus produced with a conventional one in respect of yield, a filter body as a comparative product was produced by taking the step of carding a ceramic fiber material alone and the step of needling the resulting laminate. As a result, the yield of felt was 95% for the product of the present invention constituted of the fiber laminate material 10 made of the fiber material 11 having the polyvinyl alcohol coating layer 13 formed, whereas the yield of felt was 85% for the comparative product made of the ceramic fiber material alone. More specifically, in the case of the comparative product, part of the ceramic fiber was broken and pulverized during the carding step and the needling step, so that the yield in which the starting fiber material was converted into the felt was low. By contrast, in the case of the product of the present invention, no pulverization due to breakage of the fiber occurred to prevent a decrease in the yield in which the starting fiber material was converted into the felt.

In the foregoing example of DPF, the aqueous solution of polyvinyl alcohol as the organic polymer for formation of the coating layer, i.e., covering layer 13, was used. Alternatively, molten polyvinyl alcohol may be used. An organic polymer other than polyvinyl alcohol may alternatively be used for formation of the coating layer 13. Examples of such an organic polymer include thermoplastic resins such as polyvinyl butyral, acrylic resins, polyamide resins, fluororesins, polyethylene terephthalate, polyethylene, and polypropylene. Although the Si-Ti-C-O silicon carbide ceramic was used as the material of the inorganic fiber material 12, i.e., ceramic fiber material, an Si-C-O or Si-C silicon carbide ceramic may alternatively be used.

The yield in which the fiber material 11 was converted into the felt was demonstrated based on the above-mentioned datum. Also in the assembling step of forming the felty filter into a shape such as a cylindrical shape to produce the DPF, the effect of preventing the fiber material 11 from being broken and scattered by bending was found out to be great.

A further example of the DPF of the present invention will now be described while referring to FIGS. 1, 2, 5 and 6.

Figure 5:
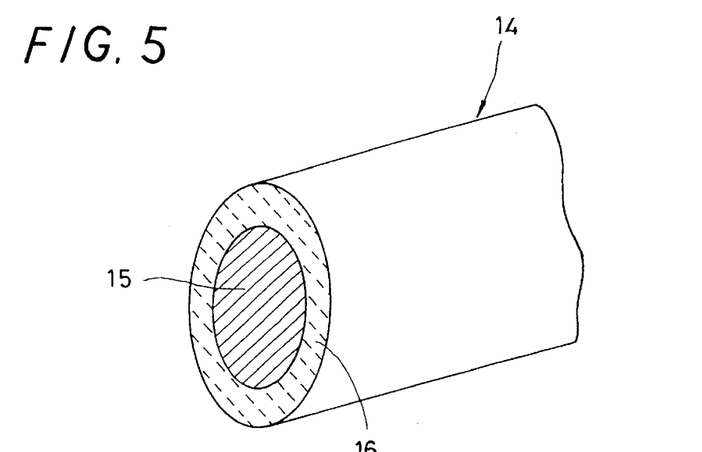
FIG. 5 is a perspective cross-sectional view showing still another example of a fiber of a fiber material comprising a heat-resistant alloy fiber material and constituting a filter body.

In this DPF, the filter 10 of body 2 thereof is constituted of a laminated filter fiber material 14. The filter fiber material 14 is constituted of a heat-resistant alloy selected from among Ti-Al alloys, Fe alloys containing at least one of Mo, Cr and Ni, and Fe-Cr-Al-Y alloys. The surface of a fiber of a heat-resistant alloy fiber material 15 constituting the filter fiber material 14 is covered with a covering layer 16 of a ceramic formed by coating. The ceramic of the covering layer 16 of the filter fiber material 14 is an Si-C, Si-Ti-C-O or Si-C-O SiC (silicon carbide) ceramic, $Al_2O_3$(alumina), or $ZrO_2$ (zirconia). Particularly, the thickness of the covering layer 16 of the ceramic covering the heat-resistant alloy fiber material 15 is set to be at most 20% of that of the heat-resistant alloy fiber material 15 as the metallic core material. A reaction product layer exists between a fiber of the heat-resistant alloy fiber material 15 and the covering layer 16 of the ceramic covering the heat-resistant alloy. For example, when the fiber of the heat-resistant alloy fiber material 15 is made of a Ti-Al alloy and alumina is selected as the material of the covering layer 16, the reaction product layer is a reaction product layer of alumina formed in the boundary therebetween through a reaction of the Al component of the alloy much precipitated on the surface of the fiber which is therefore strongly bonded to the covering layer 16. It is further preferable that the difference in coefficient of linear thermal expansion between the heat-resistant alloy of the heat-resistant alloy fiber material 15 and the ceramic of the covering layer 16 be selected to be at most 1.5-fold because no delamination therebetween occurs even when the filter fiber material 14 is subjected to repeated thermal stress.

This DPF can be produced according to the following procedure. A covering layer 16 made of $Al_2O_3$ and having a thickness of 2 μm was formed around the outer periphery of a heat-resistant alloy fiber material 15 made of a Ti-Al alloy and having a fiber diameter of 6 μm by sintering at 1,000° C. according to an alkoxide method to form a filter fiber material 14. In this case, the coefficient of linear thermal expansion of the Ti-Al alloy of the heat-resistant alloy fiber material 15 was $8.8 \times 10^{-6}$/° C., whereas the coefficient of linear thermal expansion of $Al_2O_3$ of the covering layer 16 was $7.7 \times 10^{-6}$/° C. The covering layer 16 covering the heat-resistant alloy fiber material 15 is not subject to delamination at the operating temperature of the DPF but can maintain a state of being bonded to the heat-resistant alloy fiber material 15 as the core material. The reason for this is that the Al component of the Ti-Al alloy was much precipitated on the surface thereof and then formed together with the Al component of a sol-gel into a reaction product layer of alumina in the boundary therebetween during the course of a heat treatment for sintering the ceramic film. More specifically, a film as a strong reaction product layer was formed in the boundary between the Ti-Al alloy of the heat-resistant alloy fiber material 15 and alumina of the covering layer 16 to prevent delamination of the covering layer 16 from the heat-resistant alloy fiber material 15.

Figure 6:
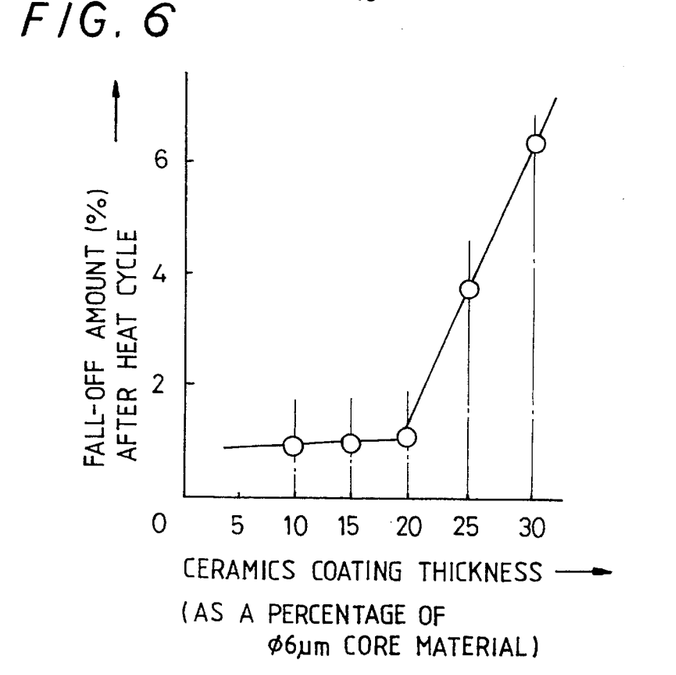
FIG. 6 is a graph showing the relationship between the thickness of a covering layer of a ceramic formed around a heat-resistant alloy fiber material by coating in a fiber material constituting a filter body and the fall-off amount of the ceramic after a heat cycle test.

In order to find out the suitable thickness of the covering layer 16 around the heat-resistant alloy fiber material 15, each of covering layers 16 of alumina having respective thicknesses of 10, 15, 20, 25 and 30% of the fiber diameter of a heat-resistant alloy fiber material 15 of 6 μmφ was formed around a fiber of the heat-resistant alloy fiber material 15, and then subjected to a heat cycle test involving 100 heat cycles of elevating the temperature from 100° C. to 900° C. and then lowering it to 100° C. again to measure the fall-off amount of the ceramic film from the covering layer 16 after the heat cycle test. The results are shown in FIG. 6, wherein the fall-off amount of ceramic is represented by the proportion (%) of ceramic that falled off. As is understandable from FIG. 6, as the thickness of the ceramic film as the covering layer 16 exceeds 20% of the fiber diameter of the heat-resistant alloy fiber material 15 as the core material, the fall-off amount of the covering layer 16 is abruptly increased. This is unfavorable from the standpoint of an improvement in the strength under heat of the filter fiber material 14.

Further, evaluation was made of the strengths under heat of a filter fiber material made of the heat-resistant alloy fiber material 15 alone for formation of a filter body 2, and the filter fiber material 14 constituted of the heat-resistant alloy fiber material 15 and the covering layer 16 of the ceramic applied on the surface of the fiber of the heat-resistant alloy fiber material 15. The tensile strengths (MPa) at 800° C. of the two materials were measured as the strengths thereof under heat. The tensile strength of the filter fiber material 14 constituted of the heat-resistant alloy fiber material 15 and the covering layer 16 of the ceramic applied thereon was 500 MPa, whereas the tensile strength of the filter fiber material made of the heat-resistant alloy fiber material 15 alone was 300 MPa. It was understood from the foregoing results that application of the covering layer 16 of the ceramic on the surface of the heat-resistant alloy fiber material 15 improved the strength under heat of the filter fiber material 14.

Although the heat-resistant alloy fiber material 15 was produced using the Ti-Al alloy as the material of the metallic fiber in the foregoing example, good results of measurement were likewise secured for heat-resistant alloy fiber materials respectively produced using Fe alloys containing at least one of Mo, Cr and Ni, and Fe-Cr-Al-Y alloys. Further, although alumina $Al_2O_3$ was used as the ceramic of the covering layer 16 formed around the heat-resistant alloy fiber material 15 by coating to produce the filter fiber material 14 in the foregoing example, it was found out that an Si-C, Si-Ti-C-O or Si-C-O silicon carbide ceramic, a zirconia ceramic or the like can be used instead. Thus, various materials can be selected as those of the heat-resistant alloy fiber material 15 and the ceramic covering layer 16. When the two materials are notably different from each other in coefficient of linear thermal expansion, an intermediate layer made of an intermediate material having a function of providing a gradient of coefficient of linear thermal expansion between the heat-resistant alloy fiber material 15 and the ceramic covering layer 16 in such a way as to control the difference in coefficient of linear thermal expansion in the boundary therebetween to at most 1.5-fold may be provided, whereby the difference in coefficient of linear thermal expansion in the boundary therebetween can be controlled to be at most 1.5-fold.

What is claimed is:

1. A diesel particulate filter apparatus provided with a filter body to be disposed in the exhaust system of a diesel engine for collecting particulates contained in exhaust gas, wherein said filter body is constituted of a fiber laminate material of fibers in felt form, individual fibers of said fiber laminate material each comprising a core material in the form of a fiber and a covering layer of a material different from that of said core material formed directly in contact with and around the outer periphery of said core material by coating, said core material being an inorganic fiber material.

2. A diesel particulate filter apparatus as claimed in claim 1, wherein said core material is a glass or ceramic fiber comprising alumina and said covering layer is made of a silicon carbide ceramic.

3. A diesel particulate filter apparatus as claimed in claim 2, wherein said covering layer is made of Si-C-O, Si-Ti-C-O, Si-N-C-O, or Si-C.

4. A diesel particulate filter apparatus as claimed in claim 2, wherein said covering layer is derived from polytitanocarbosilane, polysilazane, or polycarbosilane.

5. A diesel particulate filter apparatus as claimed in claim 2, wherein said filter body comprises an irregular laminate portion having said inorganic fiber material irregularly laminated, and weaving yarn portions into which weaving yarns are woven locally on the surfaces of said irregular laminate portion and crosswise in the thickness-wise direction thereof.

6. A diesel particulate filter apparatus as claimed in claim 2, wherein said core material of said inorganic fiber material comprises alumina and zirconia.

7. A diesel particulate filter apparatus as claimed in claim 2, wherein said core material of said inorganic fiber material comprises alumina and silica.

8. A diesel particulate filter apparatus as claimed in claim 2, wherein said core material of said inorganic fiber material comprises cordierite or mullite containing alumina and silica.

9. A diesel particulate filter apparatus as claimed in claim 2, wherein said core material of said inorganic fiber material comprises at least 98 wt. % of silicon oxide.

10. A diesel particulate filter apparatus as claimed in claim 1, wherein said core material in the form of a fiber constituting said fiber material is an inorganic fiber material made of a ceramic, and said covering layer is made of a flexible material.

11. A diesel particulate filter apparatus as claimed in claim 10, wherein said inorganic fiber material as said core material is made of an Si-C-O, Si-Ti-C-O or Si-C silicon carbide ceramic.

12. A diesel particulate filter apparatus as claimed in claim 10, wherein said inorganic fiber material as said core material comprises alumina or zirconia.

13. A diesel particulate filter apparatus as claimed in claim 10, wherein said covering layer is made of a material capable of incineration through a reaction thereof with oxygen at a temperature of at most 600° C.

14. A diesel particulate filter apparatus as claimed in claim 10, wherein said covering layer is made of a material capable of incineration through a reaction thereof with oxygen for conversion thereof into $CO_2$ and $H_2O$.

15. A diesel particulate filter apparatus as claimed in claim 10, wherein said covering layer is made of a thermoplastic resin selected from the group consisting of polyvinyl alcohol, polyvinyl butyral, acrylic resins, polyamide resins, fluororesins, polyethylene terephthalate, polyethylene, and polypropylene.

16. A diesel particulate filter apparatus provided with a filter body to be disposed in the exhaust system of a diesel engine for collecting particulates contained in exhaust gas, wherein said filter body is constituted of a fiber laminate material of fibers in felt form, individual fibers of said fiber laminate material each comprising a core material in the form of a fiber and a covering layer of a material different from that of said core material formed around the outer periphery of said core material by coating, and said core material being constituted of a heat-resistant alloy fiber material made of a heat-resistant alloy selected from the group consisting of Ti-Al alloys, Fe alloys containing at least one of Mo, Cr and Ni, and Fe-Cr-Al-Y alloys, and said covering layer being made of ceramic.

17. A diesel particulate filter apparatus as claimed in claim 16, wherein said ceramic of said covering layer is an Si-C, Si-Ti-C-O or Si-C-O silicon carbide ceramic, alumina, or zirconia.

18. A diesel particulate filter apparatus as claimed in claim 16, wherein the thickness of said covering layer is set to be at most 20% of the fiber diameter of said heat-resistant alloy fiber material as the metallic core material.

19. A diesel particulate filter apparatus as claimed in claim 16, wherein a reaction product layer exists between the heat-resistant alloy of said heat-resistant alloy fiber material and the ceramic of said covering layer.

20. A diesel particulate filter apparatus as claimed in claim 16, wherein the heat-resistant alloy of said heat-resistant alloy fiber material and the ceramic of said covering layer are selected in such a way that the difference therebetween in coefficient of linear thermal expansion is at most 1.5-fold.

21. A diesel particulate filter apparatus as claimed in claim 16, wherein an intermediate material having a function of providing a gradient of coefficient of linear thermal expansion is interposed between said heat-resistant alloy fiber material and said covering layer to control the difference in coefficient of linear thermal expansion in the boundary therebetween to at most 1.5-fold, when the difference in coefficient of linear thermal expansion between the heat-resistant alloy of said heat-resistant alloy fiber material and the ceramic of said covering layer exceeds 1.5-fold.

* * * * *